United States Patent [19]

Allemand et al.

[11] Patent Number: 5,780,160
[45] Date of Patent: Jul. 14, 1998

[54] ELECTROCHROMIC DEVICES WITH IMPROVED PROCESSABILITY AND METHODS OF PREPARING THE SAME

[75] Inventors: Pierre-Marc Allemand; Barbara A. Bigelow; F. Randall Grimes; Anoop Agrawal, all of Tucson, Ariz.

[73] Assignee: Donnelly Corporation, Holland, Mich.

[21] Appl. No.: 330,090

[22] Filed: Oct. 26, 1994

[51] Int. Cl.$^6$ .................................................. B32B 17/00
[52] U.S. Cl. ........................... 428/426; 428/430; 428/432; 428/441; 428/690; 359/265; 359/270; 359/272; 359/275
[58] Field of Search ............................. 359/265, 270, 359/272, 275; 428/430, 432, 690, 426, 441; 252/582, 583, 586

[56] References Cited

U.S. PATENT DOCUMENTS

| | | | |
|---|---|---|---|
| 4,187,003 | 2/1980 | Barclay | 359/272 |
| 4,239,350 | 12/1980 | Morita | 359/272 |
| 4,252,418 | 2/1981 | Barclay | 359/272 |
| 4,304,465 | 12/1981 | Diaz | 350/357 |
| 4,671,619 | 6/1987 | Kamimori et al. | 359/275 |
| 4,726,664 | 2/1988 | Tada | 359/275 |
| 4,728,177 | 3/1988 | Green | 350/357 |
| 4,749,260 | 6/1988 | Yang | 359/275 |
| 4,750,816 | 6/1988 | Ito et al. | 359/286 |
| 4,938,571 | 7/1990 | Cogan et al. | 359/275 |
| 4,957,352 | 9/1990 | Yasuda | 359/275 |
| 5,042,923 | 8/1991 | Wolf et al. | 359/275 |
| 5,066,112 | 11/1991 | Lynam et al. | 359/267 |
| 5,068,062 | 11/1991 | Inata | 252/518 |
| 5,073,012 | 12/1991 | Lynam | 359/265 |
| 5,080,471 | 1/1992 | Cogan et al. | 359/275 |
| 5,086,351 | 2/1992 | Couput | 359/275 |
| 5,130,842 | 7/1992 | Gauthier | 359/275 |
| 5,138,481 | 8/1992 | Demiryont | 359/269 |
| 5,140,455 | 8/1992 | Varaprasad et al. | 359/275 |
| 5,189,549 | 2/1993 | Leventis et al. | 359/271 |
| 5,215,684 | 6/1993 | Okabayashi | 359/270 |
| 5,215,821 | 6/1993 | Ho | 428/432 |
| 5,239,405 | 8/1993 | Varaprasad et al. | 359/272 |
| 5,239,406 | 8/1993 | Lynam | 359/275 |
| 5,252,354 | 10/1993 | Cronin et al. | 427/58 |
| 5,274,493 | 12/1993 | Couput | 359/275 |
| 5,298,063 | 3/1994 | Mizuguchi et al. | 106/21 D |
| 5,379,146 | 1/1995 | Defendini | 359/275 |

OTHER PUBLICATIONS

I. Harada, et al., Synth. Met., 29, E 303 (1989).

*Primary Examiner*—Timothy M. Speer
*Attorney, Agent, or Firm*—Fitzpatrick, Cella, Harper & Scinto

[57] ABSTRACT

Electrochromic devices and processes for preparing the same are provided which do not require a separate process step of ion intercalation by employing an electrochromically-inert reducing or oxidizing additive in the electrochemically active material or the electrolyte of the electrochromic devices.

25 Claims, 2 Drawing Sheets

ELECTROCHROMIC DEVICES WITH IMPROVED PROCESSABILITY AND METHODS OF PREPARING THE SAME

BACKGROUND OF THE INVENTION

1. Field of the Invention

This invention is directed to electrochromic devices having an effective amount of an electrochromically-inert reducing or oxidizing additive in the electrolyte to eliminate a separate step of changing the initial state of reduction or the state of oxidation of an electrochemically active layer, such as by ionic intercalation of the electrochemically active layer of those devices. This invention is further directed to electrochromic devices wherein the electrochemically active layer of the device is comprised of a mixture of an electrochemically active material and an electrochromically-inert reducing or oxidizing additive to eliminate the separate step of changing the initial state of reduction or the state of oxidation of an electrochemically active layer, such as by ionic intercalation of the electrochemically active material. The invention is also directed to processes of preparing the above-described electrochromic devices as well as a process for preparing an electrochemically active layer which does not require a separate step of changing the initial state of reduction or the state of oxidation of an electrochemically active layer, such as one involving ionic intercalation.

2. Related Prior Art

It is well known that light transmission and reflection can be variably controlled by electrochromic (EC) devices. It would be advantageous to use large area EC devices as variable transmission windows to reduce the energy consumption in buildings and automobiles. Moreover, EC devices are used for displays, dynamic optical filters and automotive mirror applications. Thus, a continuing need exists for EC devices which can be produced in a cost effective manner.

A conventional EC device is comprised of two opposing substrates having electronic conductors coated on the inward facing surface of the substrates. At least one of the conductor coated substrates is transparent, and for an EC window device both conductor coated substrates are transparent. Typically, the inward facing surface of each conductor is coated with an electrochemically active material. The substrates are assembled to form a cell which is filled with an electrolyte that is in conductive contact with both layers of electrochemically active material. Devices of this type are disclosed, for example, in U.S. Pat. No. 4,750,816, U.S. Pat. No. 4,938,571, U.S. Pat. No. 5,080,471, U.S. Pat. No. 5,189,549, and U.S. Pat. No. 5,215,821.

However, prior to assembling such electrochromic devices it has been often necessary to either reduce or oxidize the electrochemically active material such as by intercalation of a layer of electrochemically active material with ions by either chemical or electrochemical means. This step is employed to either reduce the electrochemically active material if cations are used or oxidize the material if anions are used. This is done to ensure that the electrochemically active materials in an electrochromic device having more than one type of electrochemically active material are all in a substantially equivalent state of light transmission, i.e., they are either colored or clear.

For example, where the two layers of electrochemically active material are tungsten oxide and vanadium oxide it is known to intercalate the latter with $Li^+$ ions prior to assembling the device. Similarly, U.S. Pat. No. 5,215,821 discloses a device having electrochemically active material layers of tungsten oxide and Prussian blue, wherein the tungsten oxide is electrochemically reduced to a blue tungsten bronze by exposing the tungsten oxide electrode under negative potential to an acidic solution prior to assembling the device. This electrochemical intercalation of the tungsten oxide allows for the extraction of the protons from the tungsten oxide to intercalate the Prussian blue electrode after the device is assembled and a voltage is applied so as to obtain a Prussian blue of high transparency.

An EC device having polyaniline and tungsten oxide electrochemically active material layers is also known. Under ambient conditions polyaniline exists in its oxidized state and is colored. However, under ambient conditions, tungsten oxide is in its oxidized state, which is transparent. Tungsten oxide can be colored by injection of electrons (reduction) with concomitant intercalation of cations, such as $Li^+$ or $H^+$. As noted previously, in order for such an electrochromic device to function properly, both layers of electrochemically active material must be in a substantially similar state of light transmission, i.e., when polyaniline is colored the tungsten oxide is colored or when polyaniline is clear the tungsten oxide is clear. This can be accomplished by reducing the polyaniline or the tungsten oxide, as appropriate prior to device assembly.

It is known to reduce the polyaniline coating by the separate step of intercalating the polyaniline with protons or by extracting anions therefrom prior to assembling the device. Upon reduction, the polyaniline becomes transparent. However, when stored under ambient conditions the polyaniline gradually oxidizes and acquires color. The tendency of polyaniline to oxidize creates processing disadvantages for such electrochromic devices since the reduced polyaniline must either be quickly assembled into the device or stored and/or processed under inert conditions.

The intercalation of ions into an electrochemically active material may also be required in other electrochromic device constructions. In particular, EC devices having only one electrochemically active electrode, can be constructed where the electrochemical activity in the electrochemically active layer is balanced by a redox active material capable of electrochemical activity in the electrolyte, such as disclosed in U.S. Pat. No. 4,671,619. A device of such construction having a polyaniline electrochemically active layer is disclosed in the co-pending U.S. Patent Application entitled "Electrochromic Devices", application Ser. No. 08/329,502, filed Oct. 26, 1994, the disclosure of which is incorporated by reference herein as if fully set forth. Such a device, however, may also suffer from the processing disadvantage that the electrochemically active polyaniline will revert to its oxidized state prior to assembling the device if not stored under inert conditions.

An object of this invention is to provide an electrochromic device having an electrochemically active layer that does not require a separate step of changing the initial state of reduction or the state of oxidation of the electrochemically active material, such as by ion intercalation.

Another object of this invention is to provide a process for preparing an electrochemically active layer on a substrate which does not require a separate processing step of initially oxidizing or reducing the electrochemically active material, such as by ion intercalation.

A further object of this invention is to provide a process for preparing an electrochromic device having an electrochemically active material which has been reduced or oxidized without the use of a separate processing step.

SUMMARY OF THE INVENTION

This invention is directed to an electrochromic device comprising two opposed conducting electrodes, at least one of which is transparent, an electrochemically active layer disposed on an opposing face of one of said electrodes and an electrolyte disposed between said electrochemically active layer and an other opposing face of said electrodes. The electrochemically active layer is comprised of an electrochemically active material which possess electrochromic properties. By electrochromic properties, it is meant that the material reversibly varies color or transmission of light as a result of an externally applied voltage.

Conventionally, when electrochromic devices such as described above are assembled, then depending on the type of the devices used, one of the electrochemically active layers may be oxidized or reduced such as by intercalating ions therein by either chemical or electrochemical processes. After this operation the device is assembled by sandwiching the electrodes to form a cavity that is filled by the electrolyte. This invention provides electrochromic devices and processes for preparing the same which do not require a separate processing step to change the initial oxidation state or reduction state of an electrochemically active material, such as by intercalating the electrochemically active layer with ions.

In a first embodiment of this invention the electrochemically active layer is a mixture of an electrochemically active material and an electrochromically-inert additive selected from the group consisting of reducing agents and oxidizing agents. The electrochromically-inert reducing or oxidizing additive is present in an effective amount to reduce or oxidize the electrochemically active material to the desired initial reduced or oxidized state. If the electrochromically-inert additive is a reducing agent, then the electrochemically active material will be reduced, while the use of an oxidizing agent results in the oxidation of the electrochemically active material. The electrochromically-inert additive may not necessarily reduce or oxidize the electrochemically active material immediately, but instead the reduction or oxidation can occur over a period of time dependent on the conditions, such as temperature and pressure, to which the electrochemically active material is exposed.

In another preferred embodiment of this invention, the electrolyte contains an electrochromically-inert additive selected from the group consisting of reducing agents or oxidizing agents. Again, the electrochromically-inert additive is present in an effective amount to reduce or oxidize an electrochemically active material in said electrochemically active layer to a desired state of initial reduction or oxidation. In this embodiment, the additive in the electrolyte reduces or oxidizes the electrochemically active layer without any other adverse effects. This process of reduction or oxidation by the additive in the electrolyte may be assisted by heat or radiation or by cycling the device or by exposing device to an appropriate electromagnetic radiation or both. The electrochemically active layer can be organic or inorganic or composites of inorganic and organic materials.

The electrochromic device of the instant invention may be further comprised of a first substrate disposed on an outwardly facing surface of one of said electrodes and a second substrate disposed on an other outwardly facing surface of said electrodes. At least one of the substrates is transparent. If the electrochromic device is a window or glazing then both electrodes and substrates must be transparent.

The electrochromic device of this invention may also further comprise another electrochemically active layer disposed on the other opposing face of said electrodes. It is preferable that the device of invention comprise at least two electrochemically active layers separated by the electrolyte or a single electrochemically active layer and an electrolyte containing an redox active material which is electrochemically active. The most preferred electrochromic device of this invention, has an electrochemically active layer of polyaniline or a polyaniline derivative and an electrolyte containing a viologen salt.

The invention is also directed to a process for preparing an electrochemically active layer on a substrate comprising the steps of:

(a) forming a liquid mixture of an electrochemically active material and an electrochromically-inert additive selected from the group consisting of reducing agents and oxidizing agents;

(b) contacting the liquid mixture to the substrate [such as by coating]; and (c) optionally exposing said contacted substrate to a temperature for a sufficient length of time for the electrochromically-inert additive to reduce or oxidize the electrochemically active material. It is particularly preferred to employ this process to prepare polyaniline coatings in their reduced form on the conducting surface of a substrate. In the above-described process the coating is deposited either in a reduced form or in a partially reduced form that self reduces upon storing for a period. Again the process can be assisted by the application of heat or radiation or both, if so desired, although such assistance is not required.

In the devices and processes of this invention an effective amount of electrochromically-inert additive is employed to ensure that the desired amount of initial reduction or oxidation of the electrochemically active material is achieved. Preferably, this means that a stoichiometric amount of additive is used compared to the amount of electrochemically active material present in the layer.

Another embodiment of this invention is directed to a process for preparing an electrochromic device having two opposed electrodes, at least one of which is transparent, an electrochemically active layer disposed on an opposing face of one of said electrodes and an electrolyte disposed between said electrochemically active layer and an other opposing face of said electrodes, said process comprising the steps of:

(a) forming said electrochemically active layer on said opposing face of one of said electrodes by contacting said opposing face, (such as by coating), with a liquid mixture of an electrochemically active material and an electrochromically-inert additive selected from the group consisting of reducing agents and oxidizing agents;

(b) optionally exposing said liquid mixture contacted opposing face to a temperature for a sufficient length of time for the electrochromically-inert additive to reduce or oxidize the electrochemically active material;

(c) assembling said electrodes in a spaced-apart opposing relationship with said electrochemically active layer facing said other opposing face of said electrodes to form a cell; and (d) filling said cell with an electrolyte.

Lastly, the invention is also directed to a process for preparing an electrochromic device having two opposed electrodes, at least one of which is transparent, an electrochemically active layer disposed on an opposing face of one of said electrodes and an electrolyte disposed between said electrochemically active layer and an other opposing face of said electrodes, said process comprising the steps of:

(a) forming said electrochemically active layer comprised of an electrochemical active material on said opposing face of one of said electrodes;

(b) assembling said electrodes in a spaced-apart opposing relationship with said electrochemically active layer facing said other opposing face of said electrodes to form a cell;

(c) filling said cell with an electrolyte containing an electrochromically-inert additive selected from the group consisting of reducing agents and oxidizing agents; and (d) optionally exposing said filled cell to a temperature for a sufficient length of time for the electrochromically-inert additive to reduce or oxidize said electrochemically active material.

These and other objects, aspects, feature and advantages of the present invention will become apparent from the following detailed description of the preferred embodiments taken in conjunction with the accompanying drawings.

DESCRIPTION OF THE PREFERRED EMBODIMENTS

Figure 1:
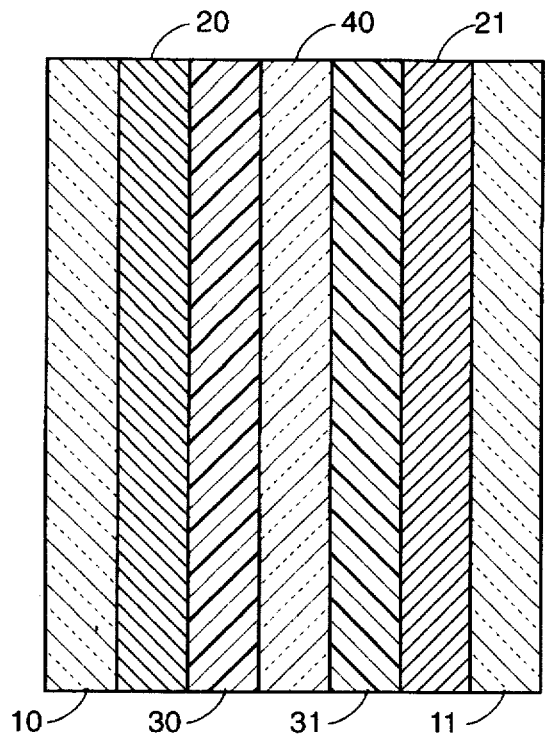
FIG. 1 is a schematic view of an EC window device according to the present invention.

The present invention is directed to electrochromic devices which may be employed such as in vehicular rearview mirrors or glazing. The device of this invention has a conductive electrode opposed to a counter conductive electrode with a layer of electrochemically active material disposed on an opposing surface of one of the electrodes and an electrolyte disposed between the electrochemically active layer and an other opposing surface of one of the electrodes. At least one of the electrodes is transparent. It is preferable that the present invention further comprise a first transparent substrate that is disposed on the outwardly facing surface of a transparent electrode and a second substrate disposed on the outwardly facing surface of the other electrode. Both substrates and electrodes of the EC device of this invention are transparent when the EC device of this invention requires complete visual transmission, such as in the case of a window or glazing.

The EC devices of this invention generally have either two electrochemically active layers separated by an electrolyte or a single electrochemically active layer with an electrochemically active species in the electrolyte. This invention is directed to electrochromic devices and processes for preparing the same which eliminate the need for a separate step in the fabrication of EC devices. Before EC devices of the prior art are assembled and/or sealed, one of the electrochemically active coatings may be oxidized or reduced such as by intercalation with ions with concomitant loss or gain of electrons. In the operation of the device, these ions are transported back and forth by the application of the appropriate voltage between either two layers of electrochemically active material via an ion conductor in the electrolyte or by ion exchange between a single electrochemically active layer and an electrolyte. In one of these states, the device is colored and in the other state it is bleached or colored differently.

According to this invention, it is not necessary to intercalate any of the layers in an EC device in a separate processing step. According to one embodiment of this invention, ionic intercalation is achieved by using an electrochromically-inert reducing or oxidizing additive in the ion conducting/electrolyte layer. Depending on the selection of the additive, the time and temperature required to achieve the desired initial oxidization/reduction can be affected. A higher temperature can be used to accelerate the process. Also, depending on the additive type, the process may also be assisted by a radiation process such as IR, UV or microwave with or without heat. These electrochromically-inert additives are typically oxidizing or reducing agents. By electrochromically-inert, it is meant that these additives are sacrificial agents which do not participate in the electrochromic reaction and that their residues are not electrochromically active, i.e., they do not undergo a reversible color changing reaction in the EC device when an appropriate voltage is applied. Furthermore, their continued presence in the assembly does not adversely affect the performance of the electrochromic device. Exemplary reducing agents, which may be organic, inorganic or organometallic reducing agents, include, without limitation, oxalic acid, ascorbic acid, and their salts, alcohols, hydrazines, mercaptans, amines, organo lithiums such as butyl lithium, borohydride and the like. Several examples of useful oxidizing agents include, without limitation, persulfates, peroxides, nitrosonium salts, and the like. The most preferred electrochromically-inert additive for use in this invention is ascorbic acid.

Another embodiment of this invention is directed to EC devices which eliminate the separate ion intercalation process of the electrochemically active material by using an electrochromically-inert additive in the film forming electrochemically active material. For example, a liquid mixture containing the electrochemically active material and the additive could be applied to a substrate to obtain a coating. The coating is deposited in a state where no further treatment is required to change its oxidation state for assembly into the device. For example, when polyaniline or its derivatives are used as one of the electrochemically active layers, then an electrochromically-inert reducing agent may be added to the liquid mixture which will be employed to deposit the coating on the substrate. Preferred additives for the reduction of polyaniline include, without limitation, hydrazine and its derivatives, acids such as ascorbic and oxalic acids, and their salts and derivatives, and the like.

FIG. 1 illustrates an example of an EC window device of this invention having transparent conducting electrodes 20 and 21 coated, respectively, on the opposing surfaces of transparent substrates 10 and 11. Two layers, 30 and 31, of electrochemically active material are disposed on the inward facing surfaces of electrodes 20 and 21, respectively. Electrochemically active layers 30 and 31 are separated by electrolyte 40. In this embodiment of the invention, either layer 30 or 31 contains an electrochromically-inert additive selected from a group consisting of reducing agents and oxidizing agents. Generally the reducing or oxidizing additive is present in at least a stoichiometric amount required to substantially achieve the desired oxidation or reduction of the electrochemically active layer 30 or 31. Desirably, this amount is at least equal to the stoichiometric equivalent of the electrochemically active material that one seeks to reduce or oxidize Preferably, the ratio of electrochromically-inert additive to the electrochemically active material is less than 10:1. However, any amount of electrochromically-inert additive may be employed which will reduce or oxidize the electrochemically active material so that a separate ion intercalation step is not required.

In an alternative embodiment of this invention, electrolyte 40 contains an electrochromically-inert additive. Typically, the electrochromically-inert additive is present in the electrolyte in an amount of about 0.01 to 10.0% by weight preferably in the amount of about 0.1 to 1.0% by weight of the electrolyte. Again, however, any amount of electrochromically-inert additive may be employed which achieves the desired reduction or oxidization of the electrochemically active material, so that a separate ion intercalation processing step is not required.

Figure 2:
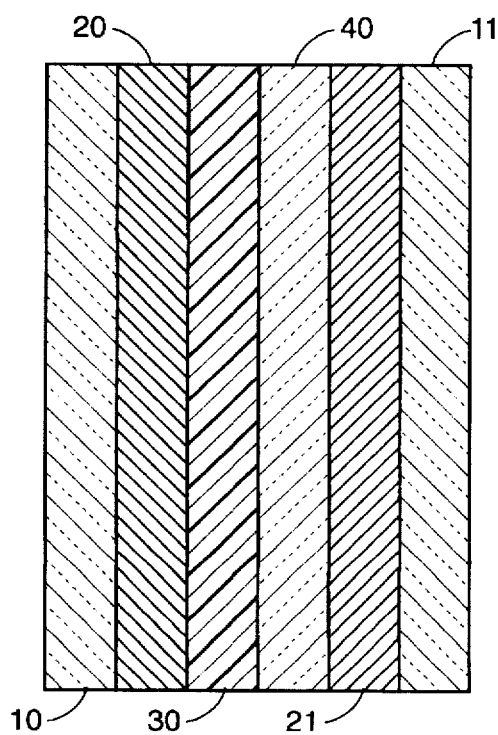
FIG. 2 is a schematic view of an another embodiment of an EC window device according to the present invention.

An alternative embodiment of an EC window device of this invention is shown in FIG. 2. This device is similar to that illustrated in FIG. 1 with the exception that only a single electrochemically active layer 30 is present and electrolyte 40 contains an electrochemically active redox promoter. As in FIG. 1, the electrochromically-inert reducing or oxidizing additive may be contained in electrochemically active layer 30 or in the electrolyte 40 or in both.

Figure 3:
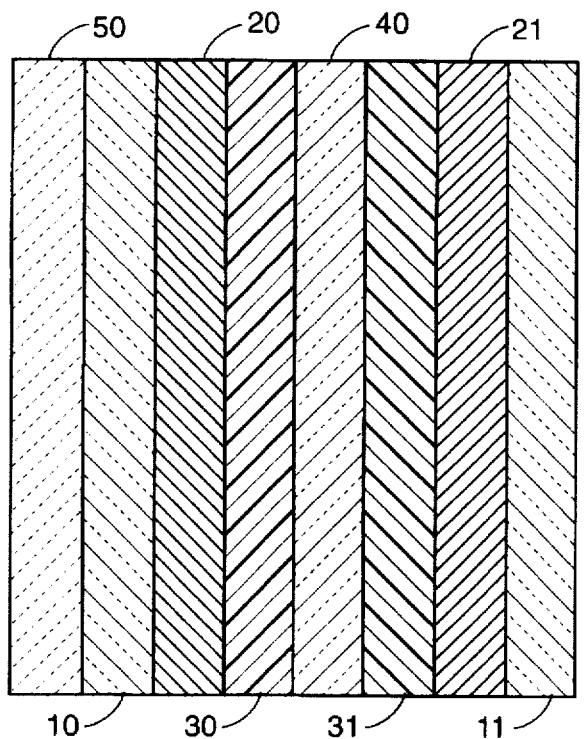
FIGS. 3 and 4 are schematic views of alternative embodiments of an EC mirror device according to the present invention.
Figure 4:
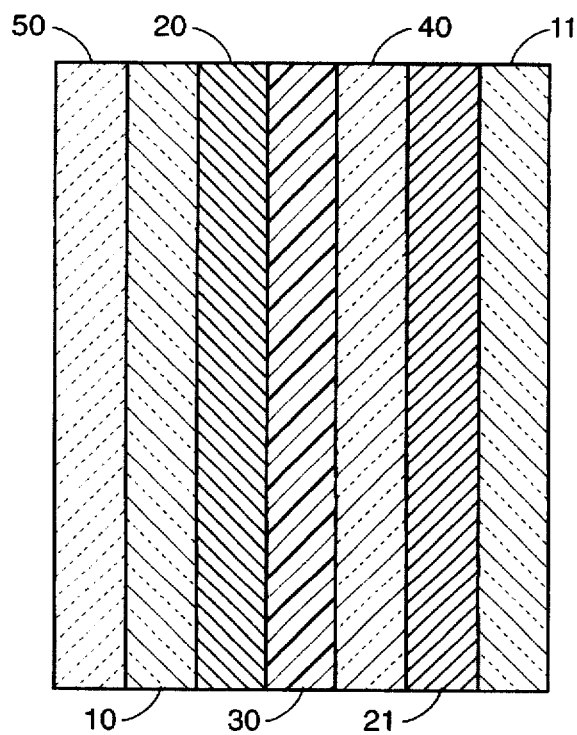

FIGS. 3 and 4 illustrate EC mirror devices of the present invention. FIGS. 3 and 4 are identical to FIGS. 2 and 1, respectively, with the exception that a reflective layer 50 is disposed on the outward facing surface of substrate 10. However, it should be understood that reflective layer 50 could be substituted for either substrates 10 and 11, disposed on the outward facing surface of substrate 11, disposed between either substrate 10 and conductor 20 or substrate 11 and conductor 21. Moreover, it is also possible to substitute reflective layer 50 for either conductor layer 20 or 21 if the reflective layer is conductive.

Typically the substrates 10 and 11 of the EC device illustrated in FIG. 1 are transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyamide, etc. It is preferable for the transparent substrates 10 and 11 to be either clear or tinted soda lime glass, preferably float glass. If plastic is employed, it is preferably abrasion protected and barrier protected using a hard coat of, for example, a silica/silicone antiabrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning EC device may be employed.

The transparent substrates 10 and 11, both glass and plastic, may have a coating on the outward facing surface. This coating may be an antireflection coating, an antifogging coating, an antiabrasion coating, an ultraviolet absorber coating and mixtures thereof. The substrates may have a coating, tape or lamination which is an antilacerative, an antiscatter, a colored, an ultraviolet blocking or an IR blocking coating, tape or lamination or mixtures thereof. It is also possible to employ transparent substrates which are specific colored substrates, photochromic substrates, infrared absorbing substrates, reflecting substrates, ultraviolet absorbing substrates and mixtures thereof.

The conducting electrodes 20 and 21 may be of the same or different material and can have different conductivities. At least one of the conducting electrodes must be transparent, although when the EC device is a window device as shown in FIG. 1 then both conducting electrodes 20 and 21 must be transparent. The materials employed for the conducting electrodes are well known to those skilled in the art. Exemplary conducting electrode materials are coatings of doped indium oxide, doped tin oxide, doped zinc oxide and the like, as well as all thin metallic coatings that are substantially transparent, such as those of gold, silver, aluminum, nickel alloy, and the like. It is also possible to employ multiple layer coatings, such as those available from Libby Owens Ford (LOF) under the tradename of TEC-Glass® or those available from PPG Industries under the tradenames SUNGATE® 300 and SUNGATE® 500. The preferred sheet resistance of these conductive coatings should be below 100 Ω/□.

The TEC-Glass® and SUNGATE® conductive coated glass comprises a multi-layer thin film structure, which includes a thin coating of fluroine-doped tin oxide with additional undercoating thin film layers disposed between the fluorine-doped tin oxide layer and the underlying glass substrate This structure inhibits reflected color and increases light transmittance resulting in a non-iridescent glass structure having a low haze (typically less than 5%). The multi-layer coating stack is made from an on-line (preferably in-bath) pyrolytically-coated (preferably by chemical vapor deposition) float glass. The layers undercoating the doped tin oxide typically comprise a silica/silicone layer and a tin oxide layer.

Preferably, the transparent conducting electrode used in this invention is a thin layer of ITO ($In_2O_3$ containing preferably approximately 5 to 20 mole % of $SnO_2$). Typically, the conducting electrodes 20 and 21 are disposed on a substrate of glass or plastic as a coating and the coating has a thickness in the range of about 5 nm to about 10,000 nm, and preferably about 10 nm to about 1,000 nm. However, any thickness of the conducting electrode coating may be employed that provides adequate conductance for the EC device and which does not appreciably interfere with the transmission of light where required.

The electrochemically active materials 30 and 31 which may be employed in the present invention are well known to those skilled in the art. These include inorganic, organic or blends and composites of inorganic and organic electrochemically active materials. Exemplary inorganic metal oxide electrochemically active materials include $WO_3$, $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$, and the like.

The electrochemically active organic materials useful in this invention are generally polymers which possess electrochromic properties and are typically electronic conductors or semiconductors. A wide range of electrochemically active polymers is known to those skilled in the art. Exemplary electrochemically active polymers useful in the instant invention include, without limitation, polyphenylene vinylenes, polythienylene vinylenes, polyalkoxythienylene vinylenes, polyfurylene vinylenes, polythiophenes, polyisothianaphthenes, polyanilines, polyarylamines, polyindoles, polypyrroles, polyalkoxyphenylenes, polyphenylenes, polyperinaphthalenes, polynaphthylamines, polyvinylmetalocenes, carbon cluster (fullerness) and carbon cluster containing polymers, polyimides, polyviologens. Other electrochemically active polymeric materials which may be employed in the present invention include, without limitation, derivatives of the aforementioned polymers, such as those prepared by sulfonation or substitution, copolymers, blends and composites, where the matrix may be organic or inorganic but at least one of the components is from the polymers or their derivatives described above. Some typical examples of these composites and blends are polyaniline or polypyrrole with prussian blue, polyaniline with phthalocyanine and/or sulfonic acid containing polymers and polyaniline in a metal oxide matrix, such as $SiO_2$, $TiO_2$, $ZrO_2$, $V_2O_5$, $WO_3$ and the like.

The preferred electrochemically active materials of the present invention is polyaniline and its derivatives, and $WO_3$. The electrochemically active material may further comprise tinting materials, heat stabilizers, spacers, UV absorbers/stabilizers and adhesion promoting agents, such as coupling agents, which, for example, may be silane coupling agents, titanium coupling agents, zirconium coupling agents, and the like.

The electrolyte 40 can be solid or liquid. The electrolytes which may be employed in this invention are known and either are readily available or can be prepared by those skilled in the art. An exemplary electrolyte of the present invention is propylene carbonate which contains a redox active material such as, for example, a viologen salt.

The electrolyte 40 may contain a redox active material which itself can be a salt (e.g., a viologen) or a nonsalt (e.g., ferrocene). Additionally, electrolyte 40 may contain a separate ionic source, such as, for example, tetraethylammonium perchlorate (TEAP) or $LiClO_4$. One manner of forming the electrolyte, for example, is by dissolving a viologen salt in propylene carbonate (PC). In addition, a dissociable salt, such as a soluble lithium salt, may be added to the solution. It is important that the solvent and also the resulting solution should have a low affinity for the solid polymeric film 30 so that this film does not peel off the substrate or dissolve while the device is in service.

Suitable solvents for the electrolyte may be selected from acetonitrile, 3-hydroxyproprionitrile, methoxypropionitrile, 3-ethoxypropionitrile, 2-acetylbutyrolactone, propylene carbonate, ethylene carbonate, glycerine carbonate, tetramethylene sulfone, cyanoethyl sucrose, γ-butyrolactone, 2-methylglutaronitrile, N,N'-dimethylformamide, 3-methylsulfolane, glutaronitrile, 3,3'-oxydiproprionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether, 4-ethenyl-1,3-dioxalane-2-one, 1,2-butylene carbonate, glycidyl ether carbonates (such as those commercially available from Texaco Chemical Company, Austin, Tex.) and combinations thereof, preferred of which include propylene carbonate.

Monomers with the appropriate polymerization initiators can be utilized as the monomer composition so that this composition can be in-situ polymerized after the cell has been filled by radiation, heat, or electrogenerated initiators to form a solid electrolyte. Such processes are described, for example, in co-pending U.S. patent application Ser. No. 08/023,675, filed Feb. 26, 1993 and co-pending U.S. patent application Ser. No. 08/193,557, filed Feb. 8, 1994, both of which are hereby incorporated by reference as if their disclosure were fully set forth herein.

Regardless of the procedure followed, the electrolyte can consist of other additives, e.g. tinting materials, UV stabilizers/absorbers, heat stabilizers, infrared absorbing dyes, moisture scavengers, fillers, viscosity modifiers, etc. The electrolyte 40 can consist of a UV absorber, and the device can be oriented in use such that incident light passes through layer 40 before layer 30. This will cause the UV radiation component to be absorbed before the light reaches the polymer 30. Thus, devices can be fabricated where UV sensitive polymers are used in layer 30. An example is a window configuration where layer 40 faces the light source, e.g. the sun, during use. Another possibility is a UV-stable rearview mirror where layer 40 is used to attenuate the UV before the light reaches layer 30.

The UV spectral characteristics of the device of this invention can be tailored by using more than one UV stabilizer. For example, UV stabilizers available under the tradenames Uvinul® 400 and Uvinul® 3050 from BASF Corporation could be used either alone, or, for example, in a 1:1 mixture.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy4,4'-dimethoxybenzophenone (BASF Corp.)], "UVINUL" N 35 [ethyl-2-cyano-3,3-diphenylacrylate (BASF Corp.)], "UVINUL" N 539 [2-ethyl hexyl-2-cyano-3,3'-diphenylacrylate (BASF Corp.)], "UVINUL" M 40 [2-hydroxy-4-methoxybenzophenone (BASF Corp.)], "UVINUL" M 408 [2-hydroxy-4-octoxy-benzophenone (BASF Corp.)], "TINUVIN" P [2-(2H-benzotriazole-2-yl)-4-methylphenyl (manufactured by Ciba Geigy Corp., Hawthorne, N.Y.], "TINUVIN" 327 [2-(3', 5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)], "CYASORB" UV 24 [2,2'-dihydroxy-4-methoxy-benzophenone (manufactured by American Cyanamid Co., Wayne, N.J.)], monobenzoates (available from Eastmann Chemicals, Kingsford, Tenn. and Sandoz Chemical Corp., Charlotte, N.C.), resourcinol monobenzoates, formamidine (available from Givaudan-Roure, Clifton, N.J.), phenylformamidine and combinations thereof, where a suitable range of the ultraviolet stabilizing agents is from about 0.2% (w/v) to about 40% (w/v), with about 5% (w/v) to about 15% (w/v) being preferred. The ultraviolet stabilizing agent should be chosen with an eye toward avoiding an adverse affect on performance and electrolyte function.

In addition, ultraviolet absorbing layers may be coated onto, or adhered to, the first substrate and/or second substrate, and preferably the substrate closest to the source of UV radiation, to assist in shielding the electrochromic device from the degradative effect of ultraviolet radiation. Suitable ultraviolet absorbing layers include those recited in U.S. Pat. No. 5,073,012 entitled "Anti-scatter, Ultraviolet Protected, Anti-misting Electro-optical Assemblies", filed Mar. 20, 1990, the disclosure of which is incorporated by reference herein.

Examples of such layers include a layer of DuPont BE1028D which is a polyvinylbutyral/polyester composite available from E.I. DuPont de Nemours and Company, Wilmington, Del., and SORBALITE™ polymeric UV blockers (available from Monsanto Company, St. Louis, Mo.) which comprise a clear thin polymer film with UV absorbing chromophores incorporated, such as by covalent bonding, in a polymer backbone. The SORBALITE™ clear thin polymer film when placed on a surface of the substrate closest to the source of UV radiation (such as the sun), efficiently absorbs UV light below about 370 mm with minimal effect on the visible region. Thickness of the SORBALITE™ film is desirably in the range of about 0.1 microns to 1000 microns (or thicker); preferably less than 100 microns; more preferably less than about 25 microns, and most preferably less than about 10 microns. Also, UV absorbing thin films or additives such as of cerium oxide, iron oxide, titanium oxide or such oxides with dopants can be used to protect the electrochromic device from UV degradation.

Polyaniline and many of its derivatives, which are the preferred electrochemically active polymeric materials of this invention, are transparent and almost colorless in the reduced state and when oxidized change to green and then to a blue color with further oxidation. When a viologen salt is dissolved in PC, it is colorless in its oxidized state. Therefore, when polyaniline is used as the coating material in layer 30, it is preferred that both components, i.e., the polyaniline coating 30 and the electrolyte 40, be in the transparent state.

The EC window device shown in FIG. 1 may be prepared, for example, according to the process of this invention. First, an electrochemically active material such as polyaniline may be used as layer 30 and tungsten oxide may be used as layer 31, while a lithium ion conductor may be employed as the electrolyte 40. A typical lithium ion conductor can be a liquid or solid. For example, a liquid lithium ion conductor can be made by dissolving a lithium salt into a polar solvent such as propylene carbonate. It is preferred, to employ two conductive substrates, for example, glass coated with doped tin oxide, doped zinc oxide, doped indium oxide, which have surface resistivities preferably below 100 $\Omega/\square$. Indium oxide doped with tin and tin oxide doped with fluorine are available commercially. The latter is also sold under the trade names TEC-Glass® and SUNGATE® from Libby Owens Ford (LOF) and PPG Industries, respectively. One of the electrochemically active coatings, e.g., polyaniline, is deposited on the conductive side of one of these substrates. This can be done by chemical or electrochemical methods, which are known to those skilled in the art. The former is easily scalable to large-area substrates and amenable to commercial production at low costs. In the chemical method, a polyaniline is typically mixed in a liquid and then the liquid mixture is contacted with the substrate such as by casting, spinning, roller applying, spraying, dipping, or by similar wet chemical means. As the liquid evaporates, if an electrochromically-inert reducing agent is not present, then a green-blue color coating is left behind which, when left in air, continues to oxidize to a more blue color. Typically, the thickness of this coating will be between 10 nm and 10,000 nm. However, the preferred range is between 50 and 1000 nm. On the other substrate, a coating of tungsten oxide (in the same thickness range as above) is deposited on the conductive side. This coating can be deposited by physical vapor deposition, chemical vapor deposition (CVD), plasma-assisted CVD and by wet chemical methods (e.g., sol-gel process). The advantage of the liquid casting process is low capital costs and the ability to make the coatings with mixed cations to tailor the optical, chemical, electrochemical or physical properties. After both the coatings are obtained, a cell is constructed such that both the coatings face inwards. If the ion conductor is a solid, then a lamination process can be used, or a hollow cavity with a predetermined thickness can be formed that can be filled by the liquid electrolyte or ion conductor. The ion conductor formulation can be used in the liquid form or, depending on the composition, it can be converted into a solid by reactions that may be assisted by radiation or heat or both. The construction and general assembly of mirrors and glazings are well known as disclosed, for example, in U.S. Pat. No. 5,066,112 and U.S. Pat. No. 5,239,406, the disclosure of both of which are incorporated by reference herein as if fully set forth.

For liquid electrolytes, the cell can be constructed in the following way. The electrochemically active material coated substrates are adhered together at the edges by an adhesive or sealant (forming a seal), preferably with a slight offset to attach the conductive busbars and/or conducting leads. The separation between the substrates is maintained by putting spacers (such as microbeads, cylinders, etc.) either in the adhesive or between the two plates or by both methods. The space may also be maintained by stops such as tapes, shims, etc. Typically, the thickness of the cavity is in the range of 1 micrometer to 10,000 micrometers, although the preferred range is between 10 and 1000 micrometers and the most preferred is 50 to 500 micrometers. The area of the coatings that comes in contact with this edge sealant may have to be chemically modified so that good adhesion and a seal is obtained. Sometimes it may be necessary to chemically deposit (or modify) this area on the conductive substrate before putting down any of the electrochemically active coatings 30 or 31 for obtaining good sealing characteristics. One may even remove the coatings from this area before cell fabrication and then chemically treat this with modifiers, e.g., coupling agents, to improve adhesion. A good seal is important to form a device that will withstand the environment and have a long, useful life. Coupling agents, e.g., those based on silanes, aluminates, titanates, zirconates, etc. may be used including those such as indium and/or tin reactive sites to enhance adhesivity to ITO and tin oxide transparent conductors. One may also add these materials to the adhesives directly. The adhesives may also consist of fillers, stabilizers, colorants, etc. to enhance their appearance, physical and chemical properties. The adhesive may be organic, inorganic, thermoplastic, thermosetting, solventless or solvent-containing, or even double-sided tapes and adhesives that may be activated by temperature, radiation, etc.

The resulting cell may be backfilled by procedures such as described in the U.S. Pat. No. 5,140,455, the disclosure of which is incorporated by reference as if fully set forth herein. That patent also describes a two-hole filling procedure which may be used if so desired. We have discovered that the cavity can also be filled by a capillary method. In this method, two holes at the two opposite ends of the cell are required. One of these holes is then submerged into the electrolyte. The other hole remains at the highest end of the cell. The cell starts to fill by a capillary action, and the air or inert gas [nitrogen, argon or their like] in the cell is expelled at the other (high) end. To obtain a good cell without any air or gas pockets, the parameters such as the size of the holes, cavity thickness, cell size, amount of cell to be submerged, etc., must be optimized. One may even assist this process by a positive pressure on the electrolyte after submerging one end of the cell.

The electrolyte can consist of UV stabilizers, thermal stabilizers, non-chemically active dyes, fillers and other additives, but in addition to all these, in one embodiment of this invention it will also consist of at least one reducing or oxidizing agent as described above, i.e., an electrochromically-inert reducing or oxidizing additive. A preferred exemplary electrochromically-inert additive, which may be added to the electrolyte is ascorbic acid. A preferred concentration is at least stoichiometrically equivalent to the amount of the reduction required in one of the coatings in the device, e.g., equivalent to the polyaniline content in the coating that is being reduced.

The device will usually appear colored initially after completion of filling according to the method of this present invention (due to the color of polyaniline), but over a period of time it will bleach as polyaniline is reduced. For example, it may take up to or more than 24 hours at room temperature but only a few hours at an elevated temperature of approximately 100° C.

After this treatment, the devices can be operated by applying a negative potential to the $WO_3$ and a positive potential to the polyaniline side for coloration and the reverse for bleach.

If a solid electrolyte is desired one could commence with a monomer composition that could be polymerized by radiation (e.g., UV, IR microwave, etc.) or by elevating the temperature further. The preparation of a solid electrolyte can be readily achieved by those skilled in the art.

A similar method can be used for making EC devices as shown in FIGS. 2 and 4. An automotive mirror EC device as shown in FIG. 4 using polyaniline as the layer 30 could be prepared in the following way. Typically, a conducting substrate is mirrored on the non-conductive side, and the polyaniline coating is deposited on the conductive side. In a variation, a non-conductive glass can be coated with a mirroring metal such as silver, aluminum, stainless steel, chrome or rhodium, etc., and the polyaniline coating can be deposited on top of this layer. Thus, the reflector or the mirror also works as the electronic conductor. To make the device as shown in FIG. 4, the hollow cavity is formed as described earlier. The electrolyte typically consists of a polar solvent such as propylene carbonate, ionic salt and/or cathodic material (for a device containing polyaniline coatings). This material could be a viologen salt. The electrolyte can also have non-electrochemically active dyes, UV stabilizers, heat stabilizers, fillers, etc. However, the choice of the electrochromically-inert reducing additive should be done carefully so that it does not interact with the cathodic material (in this case viologen salt). The reactivity of the viologen or other cathodic salts towards the reducing additive will also change with the type of ion on the salt. For example, when viologen triflate and ascorbic acid are present in the electrolyte within suitable concentrations, the color of the electrolyte doesn't change instantaneously showing that the latter does not reduce the viologen. Again, as described earlier, after the device is filled and sealed, polyaniline is reduced in situ. The reduction time can be controlled by varying the temperature.

Another process of this invention for eliminating the separate ionic intercalation step is by putting an electrochromically-inert additive selected from a group consisting of reducing agents and oxidizing agents in the film forming electrochemically active material for one of the electroactive films. The cell is then assembled as described above and there is no need to add any further electrochromically-inert additive in the electrolyte. It may even be desirable that both methods are combined, i.e., the additive is employed in the coating material and also the same or another additive or a mixture of these is added to the electrolyte. One of the advantages of putting the additive in the film forming material is the possibility of using this film for all thin film solid state devices. For example, a reduced polyaniline or a derivative of it can be deposited as an electroactive coating on a conductive layer employing the method of this invention. This reduced coating can then be put into a physical vapor or a chemical vapor deposition chamber to deposit the other layers to advantageously complete an EC device without the need for any further separate reduction step.

The other layers in such an EC device could, for example, consist of tantalum oxide as an ion conductor, tungsten oxide as a counter electrode and a metallic or transparent conductive coating as a electronic conductor, respectively. A suitably thick [such as of aluminum or silver of thickness of 400 Å or greater] metallic conductor will give an EC mirror device.

Although polyaniline or a derivative of polyaniline is a preferred electrochemically active material for use in this invention, it is clear that this invention encompasses other electrochemically active materials. The conducting electrodes could be coated with only inorganic materials such as tungsten oxide, molybdenum oxide, vanadium oxide, iridium oxide, and nickel oxide, Prussian Blue or electrochemically active polymers, such as polyaniline. The conducting electrodes could also be coated with mixtures and composites where one of the components are such polymers. These coatings could also consist of electrochemically active polymers either heterogeneously or homogeneously dispersed in an ion conductive matrix. The matrix could be a thermoplastic or a thermoset polymer or it can be inorganic.

The EC devices of this invention are particularly useful as electrochromic mirrors. The electrochromic mirrors of the present invention are suitable for use as electrochromic rearview mirrors (e.g., truck mirrors, interior and exterior mirrors for motor vehicles), architectural mirrors or specialty mirrors, like those useful in aeronautical, periscopic or dental and medical applications.

In addition to electrochromic mirrors, electrochromic devices, such as electrochromic glazings (e.g., architectural glazings, like those useful in the home, office or other edifice, aeronautical glazings, such as those which may be useful in aircraft; or vehicular glazings, for instance, windows, like windshields, side windows and backlights, sun roofs, sun visors or shade bands); electrochromic optically attenuating contrast filters, such as contrast enhancement filters, suitable for use in connection with cathode ray tube monitors and the like; electrochromic privacy or security partitions; electrochromic solar panels, such as sky lights; electrochromic information displays; and electrochromic lenses and eye glass, may also benefit from that which is described herein.

The examples which follow are intended as an illustration of certain preferred embodiments of the invention, and no limitation of the invention is implied.

EXAMPLE 1

Preparation and Reduction of Polyaniline Coatings in One Step

Polyaniline thin coatings were obtained in their reduced form directly from a liquid mixture containing polyaniline. When a stoichiometric amount or an excess amount of electrochromically-inert reducing additive, such as phenylhydrazine, was added to a 2% (w/v) mixture of polyaniline in 88% aqueous formic acid, the mixture changed slightly in color. This composition was used to spin cast or dip coat glass substrates to give very light green films. These polyaniline films turned completely colorless and transparent after heating at about 100° C. in vacuum or in air for a short time. The FT-IR spectra of these films were identical to those reported in the literature for leucoemeraldine base, i.e., the reduced form of polyaniline (I. Harada, Y. Furukawa, F. Ueda, *Synth. Met.* 1989, 29, E303.) The films turned blue upon prolonged exposure to air.

EXAMPLE 2

Preparation and Reduction of Polyaniline Coatings in One Step with Phenylhydrazine, and Fabrication of an EC Mirror A liquid composition of partially reduced polyaniline was prepared by adding 3 mL of a liquid mixture of 10% phenylhydrazine in aqueous formic acid to 5 mL of 2% (w/v) polyaniline mixture in 88% formic acid. The liquid composition was spin cast on half wave (HW) ITO glass (about 12–15 ohms/□, about 10×2.5×0.063 in.), mirrored on the non-conductive side, and then dried at about 70° C. in a vacuum oven to give a colorless and transparent film of leucoemeraldine base.

Another HW ITO conductive glass substrate of the same size was used as the counter electrode. The cell was assembled under argon by spacing apart these two substrates at the edges with an epoxy adhesive containing 53 μm glass beads spacers. The substrates having the same dimensions, they were slightly offset to provide for a place to attach the electrical leads. The epoxy was thermally cured at 120° C. for 1 hour under inert atmosphere. The cell was vacuum backfilled with an electrolyte consisting of ethyl viologen diperchlorate (0.1M), lithium perchlorate (1.0M), 6% (w/w) Uvinul® 400 in propylene carbonate. When +1.0 V was applied to the polyaniline coated electrode, the reflectivity of the cell changed from 65%R to 11%R (measured at 550 nm) in about 12 seconds. When −0.3 V was applied, the reflectivity changed from 11%R to 65%R in about 16 seconds.

EXAMPLE 3

Preparation and Reduction of Polyaniline Coatings in One Step with Ascorbic Acid, and Fabrication of an EC Mirror Polyaniline thin coatings were obtained in their reduced form directly from a liquid mixture in the following manner. When 1% of L-ascorbic acid was added to a 1.5% (w/v) liquid mixture of polyaniline in 88% aqueous formic acid, the mixture became more viscous and changed slightly in color ($\lambda max=806$ nm). This liquid mixture was used to spin cast thin films of polyaniline on mirrored HW ITO glass substrates (2×10 in.). These polyaniline films were light green in color. The FT-IR spectra of these films showed the presence of polyaniline in its emeraldine and leucoemeraldine oxidation states, and residual ascorbic acid. The films turned completely transparent after washing with methanol. After washing with methanol, the FT-IR spectra were identical to those reported in the literature for leucoemeraldine base. The films turned blue in a few days upon exposure to air.

The light green polyaniline coatings were dried in air, rinsed with methanol and dried in nitrogen. These coatings were then assembled into cells. Another HW ITO conductive glass substrate of the same size was used as the counter electrode. The cell was assembled by spacing apart these two substrates at the edges with an adhesive glue containing 105 μm glass beads spacers. The substrates having the same dimensions, they were slightly offset to provide for a place to anchor the electrical leads. The epoxy was thermally cured at 120° C. for 1 hours under normal atmosphere. The cell was vacuum backfilled with an electrolyte consisting of a 0.1M solution of ethyl viologen triflate in propylene carbonate (PC) containing 6% (w/w) Uvinul® 400. After filling, the cell was sealed and placed in an oven at 100° C. for 4 hours. When +1.0 V was applied to the polyaniline coated electrode, the reflectivity (photopic filter) of the cell changed from 66.1%R to 10.7%R in about 5.2 seconds. When −0.3 V was applied, the reflectivity changed from 10.7%R to 66.1%R in about 11.3 seconds. When a similar EC cell was constructed eliminating the methanol rinsing step and was tested as described above, the cell colored from 63.7% to 17.2% in 8.8 seconds.

EXAMPLE 4

EC Device with a Polyaniline Coating That Is Reduced with an Additive Containing Electrolyte An electrochromic vehicular rearview mirror was constructed using an EC device prepared in the following manner. A 2% (w/v) liquid mixture of polyaniline (PANI) was made by stirring 20 g of PANI (Emeraldine Base) in 1000 mL 88% aqueous formic acid (FA), overnight at room temperature. The liquid mixture was filtered through a 1.5 μm glass filter to remove coarse residues. This liquid mixture did not turn into a gel on standing even after one year. A 1.3% (w/v) solution of PANI in 88% aqueous formic acid was made by diluting the appropriate amount of this 2% (w/v) liquid mixture with formic acid.

A thin film of polyaniline was spin-cast onto a conducting substrate from this 1.3% aqueous formic acid liquid mixture. The substrate was half wave ITO glass, mirror shaped, about 10×2.5×0.063 in. in size, and mirrored on the non-conductive side. The green polyaniline coating was allowed to dry for several hours under normal atmosphere conditions, where it changed into a dark blue film.

These polyaniline coated glass substrates were assembled into cells. Another HW ITO conductive glass substrate of the same size was used as the counter electrode. The cell was assembled by sealing these two substrates at the edges with an epoxy adhesive containing 105 μm glass beads spacers. One hole was left in the glue to allow the vacuum backfilling of the cell with the electrolyte. The substrates having the same dimensions, they were slightly offset to provide for a place to anchor the electrical leads. The epoxy was thermally cured at 120° C. for 1 hour under normal atmosphere. The cell was vacuum back filled with an electrolyte consisting of 34 g of propylene carbonate (PC), 1.4 g of ethyl viologen triflate, 2.0 g of Uvinul® 400, and 0.036 g of ascorbic acid. The filling hole was plugged with a UV curable adhesive (Sarbox® 500 containing 4% (w/w) Irgacure® 184) and the dark blue cell was placed in an oven at 100° C. for 4 hours. The cell became substantially colorless. When +1.0 V was applied to the polyaniline coated electrode, the reflectivity (photopic filter) of the cell changed from 74.9%R to 8.4%R. When −0.3 V was applied, the reflectivity went back to 74.9%R. The cell colored from 60% to 10% in about 9.9 seconds and bleached from 10% to 60% in about 12.6 seconds. The electrochromic rearview mirror constructed with this device continued to show excellent performance after 60,000 cycles at room temperatures. The mirror was successfully test driven in an automobile and exhibited heat stability, UV stability and general performance suitable for both interior and exterior use on an automobile.

EXAMPLE 5

EC Device with a Tungsten Oxide Coating and a Polyaniline Coating That Is Reduced with an Electrolyte Containing an Additive A thin film of polyaniline was spin-cast onto a conducting substrate from the 1.30% aqueous formic acid liquid mixture employed in Example 4. The substrate was half wave ITO glass, mirror shaped, about 10×2.5 in. and mirrored on the non-conductive side. The green polyaniline coating was allowed to dry for several hours under normal atmosphere conditions, where it changed into a dark blue film.

An electrochromic film of tungsten oxide/lithium oxide composite prepared by first preparing a solution of 11.7 g of peroxytungstic acid ester, [which may be prepared according to the disclosure of U.S. Pat. No. 5,252,354, which is incorporated by reference herein] and 0.16 g of lithium ethoxide in 100 mL of reagent grade ethanol. This sol-gel solution was then spun onto a conducting substrate. The substrate was half wave ITO glass, of the same size as the polyaniline coated substrate. The transparent film thus deposited was not fired at high temperature but simply allowed to dry a few hours at room temperature under normal atmospheric conditions.

This WO$_3$ coated HW ITO conductive glass substrate was used as the counter electrode for previously made polyaniline coated glass substrate. The cell was assembled by sealing these two substrates at the edges with an epoxy adhesive containing 105μ glass beads spacers. One hole was left in the glue to allow the vacuum backfilling of the cell with the electrolyte. The substrates having the same dimensions, they were slightly offset to provide for a place to anchor the electrical leads. The epoxy was thermally cured at 120° C. for 1 hour under normal atmosphere. The cell was vacuum back filled with an electrolyte consisting of 30 g of propylene carbonate (PC), 3.9 g of lithium triflate, 1.8 g of Uvinul® 400, 0.04 g of ascorbic acid, and 0.25 g of water. The dark blue cell was placed in an oven at 100° C. After 4 hours, the cell was colorless. When +1.2 V was applied to the polyaniline coated electrode, the reflectivity (photopic filter) of the cell changed from 60%R to 10%R in about 9.2 seconds. When −0.6 V was applied, the reflectivity changed from 10%R to 40%R in about 2.2 seconds.

EXAMPLE 6

EC Mirror with a Tungsten Oxide Coating

An electrochromic film of tungsten oxide was coated, as given in Example 5, on half wave ITO coated soda lime glass substrate having an automotive rearview mirror shape of about 10×2.5 in. To this, a second half wave ITO conductive glass substrate was laminated to form a cell with the two substrates spaced apart at their periphery with an epoxy adhesive seal containing 88 μm glass bead spacers. One hole was left in the glue to allow the vacuum backfilling of the cell with the electrolyte. The substrates having the same dimensions, they were slightly offset to provide for a place to attach the electrical leads. The epoxy was thermally cured at 120° C. for 1 hour under normal atmosphere. The cell was vacuum backfilled with an electrolyte consisting of 13.5 g of propylene carbonate, 18.9 g of tetramethylene sulfone, 0.23 g of ferrocene, 0.03 g of lithium perchlorate, 0.09 g of lithium tetrafluoroborate, 1.64 g of Uvinul 400, and 0.0172 g of ascorbic acid. The filling hole was plugged with a UV curable glue (Sarbox 500 containing 4% (w/w) Irgacure 184) and the colorless cell was cycled by alternately applying −1.2 V and 0 V to the Tungsten Oxide coated electrode. After 75 cycles the cell remained blue in color. When −1.2 V was applied to the tungsten oxide coated electrode, the reflectivity (photopic filter) of the cell changed from 38.5%R to 12.5%R. When 0 V was applied, the reflectivity went back to 38.5%R. A similar device prepared without ascorbic acid changed from a colorless 80.4%R to 6.4%R with application of 1.2 V to the tungsten electrode, and back to 80.4%R with application of 0 V.

EXAMPLE 7

Same as Example 6 using Evaporated Tungsten Oxide

An electrochromic film of tungsten oxide, 500 nm thick, was prepared by e-beam evaporation on half wave ITO coated soda lime glass substrate having an automotive rearview mirror shape of about 10×2.5 in. To this, a second half wave ITO conductive glass substrate was laminated to form a cell with the two substrates spaced apart at their periphery with an epoxy adhesive seal containing 88 μm glass beam spacers. One hole was left in the glue to allow the vacuum backfilling of the cell with the electrolyte. The substrates having the same dimensions, they were slightly offset to provide for a place to attach the electrical leads. The epoxy was thermally cured at 120° C. for 1 hour under normal atmosphere. The cell was vacuum backfilled with an electrolyte consisting of 13.5 g of propylene carbonate, 18.9 g of tetramethylene sulfone, 0.23 g of ferrocene, 0.03 g of lithium perchlorate, 0.09 g of lithium tetrafluoroborate, 1.64 g of Uvinul 400, and 0.0172 g of ascorbic acid. The filling hole was plugged with a UV curable glue (Sarbox 500 containing 4% (w/w) Irgacure 184) and the colorless cell was cycled by alternately applying −1.2 V and 0 V to the Tungsten Oxide coated electrode. After 75 cycles the cell remained blue in color. When −1.2 V was applied to the tungsten oxide coated electrode, the reflectivity (photopic filter) of the cell changed from 50.9%R to 5.7%R. When 0 V was applied, the reflectivity changed back to 50.9%R.

EXAMPLE 8

EC Mirror with a Polyaniline Coating

A film of polyaniline 220 nm thick, was prepared as given in Example 4, on half wave ITO coated soda lime glass substrate having an automotive rearview mirror shape of about 10×2.5 in. To this, a second half wave ITO conductive glass substrate was laminated to form a cell with the two substrates spaced apart at their periphery with an epoxy adhesive seal containing 105 μm glass bead spacers. One hole was left in the glue to allow the vacuum backfilling of the cell with the electrolyte. The substrates having the same dimensions, they were slightly offset to provide for a place to attach the electrical leads. The epoxy was thermally cured at 120° C. for 1 hour under normal atmosphere. The cell was vacuum backfilled with an electrolyte consisting of ethyl viologen triflate (0.1M) in propylene carbonate containing 6% (w/w) Uvinul 400 and 0.4% (w/w) ascorbic acid. The concentration of ascorbic acid in this example is four times higher than used in Example 4. The increased concentration of ascorbic acid was employed to reduce the high end reflectivity of the mirror, such as is often preferred for exterior automotive mirrors. The filling hole was plugged with a UV curable glue (Sarbox 500 containing 4% (w/w) Irgacure 184) and the dark blue cell was placed in an oven at 100° C. for 4 hours. The cell became totally colorless. The colorless cell was cycled by alternately applying 1.0 V and −0.3 V to the Pani coated electrode. After 500 cycles the cell remained blue in color. When 1.0 V was applied to the Pani coated electrode, the reflectivity (photopic filter) of the cell changed from 55%R to 5.7%R. When −0.3 V was applied, the reflectivity changed back to 55%R.

EXAMPLE 9

EC Mirror with a Tungsten Oxide Coating

An electrochromic film of tungsten oxide was prepared as given in Example 5, on half wave ITO coated soda lime glass substrate having an automotive rearview mirror shape of about 10×2.5 in. To this, a second half wave ITO conductive glass substrate was laminated to form a cell with the two substrates spaced apart at their periphery with an epoxy adhesive seal containing 88 μm glass bead spacers. One hole was left in the glue to allow the vacuum backfilling of the cell with the electrolyte. The substrates having the same dimensions, they were slightly offset to provide for a place to attach the electrical leads. The epoxy was thermally cured at 120° C. for 1 hour under normal atmosphere. The cell as vacuum backfilled with an electrolyte consisting of 13.5 g of propylene carbonate, 18.9 g of tetramethylene sulfone, 0.23 g of ferrocene, 0.03 g of lithium perchlorate, 0.09 g of lithium tetrafluoroborate, 1.64 g of Uvinul 400, and 0.02 g of phenyl hydrazine. The phenyl hydrazine was added to reduce the high end reflectivity of the mirror. The filling hole was plugged with a UV curable glue (Sarbox 500 containing 4% (w/w) Irgacure 184) and the colorless cell was cycled by alternately applying −1.2 V and 0 V to the Tungsten Oxide coated electrode. After 250 cycles the cell remained blue in color. When −1.2 V was applied to the tungsten oxide coated electrode, the reflectivity (photopic filter) of the cell changed from 15.0%R to 2.3%R. When 0 V was applied, the reflectivity changed back to 15%R.

Other variations and modifications of this invention will be obvious to those skilled in the art.

We claim:

1. An electrochromic device comprising two opposed conducting electrodes, at least one of which is transparent, an electrochemically active layer disposed on an opposing face of one of said electrodes and an electrolyte disposed between said electrochemically active layer and an other opposing face of said electrodes, wherein said electrolyte contains an electrochromically-inert additive selected from the group consisting of reducing agents and oxidizing agents in an effective amount to reduce or oxidize an electrochemically active material in said electrochemically active layer, wherein the reducing agents are selected from the group consisting of oxalic acid, ascorbic acid, mercaptans, hydrazines, amines, organo lithium and mixtures thereof and the oxidizing agents are selected from the group consisting of persulfates, peroxides, nitrosonium salts and mixtures thereof.

2. The electrochromic device according to claim 1, further comprising a first substrate disposed on an outwardly facing surface of one of said electrodes and a second substrate disposed on an other outwardly facing surface of said electrodes, wherein at least one of said substrates is transparent.

3. The electrochromic device according to claim 2, wherein one of said substrates is reflective.

4. The electrochromic device according to claim 2, wherein said device is a vehicular mirror or a vehicular glazing.

5. The electrochromic device according to claim 4, wherein said vehicular mirror is an interior vehicular mirror or an exterior vehicular mirror.

6. The electrochromic device according to claim 5, wherein said interior vehicular mirror is a rearview mirror.

7. The electrochromic device according to claim 4, wherein said vehicular glazing is selected from the group consisting of a vehicular window, a sun roof, sunvisor and a shadeband.

8. The electrochromic device according to claim 1, wherein the electrochromically-inert additive is at least one reducing agent.

9. The electrochromic device according to claim 1, wherein the electrochromically-inert additive is at least one oxidizing agent.

10. The electrochromic device according to claim 1, wherein the electrochemically active layer is comprised of an electrochemically active polymeric material.

11. The electrochromic device according to claim 10, wherein the electrochemically active polymeric material is selected from the group consisting of polyaniline, a polyaniline derivative and mixtures thereof.

12. The electrochromic device according to claim 10, wherein the electrochemically active polymeric material is selected from the group consisting of a copolymer, a blend and a composite.

13. The electrochromic device according to claim 1, wherein the electrochemically active layer is electrochromic.

14. The electrochromic device according to claim 1, further comprising a second electrochemically active layer disposed on the other opposing face of said electrodes.

15. The electrochromic device according to claim 1, wherein the at least one transparent electrode is selected from the group consisting of doped indium oxide, doped tin oxide and doped zinc oxide.

16. The electrochromic device according to claim 1, wherein said electrolyte contains at least one ionic material.

17. The electrochromic device according to claim 1, wherein the electrolyte contains a viologen salt.

18. The electrochromic device according to claim 1, wherein one of said electrodes is reflective.

19. The electrochromic device according to claim 1, wherein the electrochemically active layer contains a component selected from the group consisting of UV stabilizers, heat stabilizers and mixtures thereof.

20. The electrochromic device according to claim 1, wherein the electrolyte contains a component selected from the group consisting of UV stabilizers, adhesion promoting agents, heat stabilizers and mixtures thereof.

21. The electrochromic device according to claim 1, wherein the electrolyte is comprised of a mixture of at least two solvents.

22. The electrochromic device according to claim 1, wherein the electrolyte contains a passive visible or infrared dye.

23. The electrochromic device according to claim 1, wherein the electrolyte is comprised of an inert polymeric additive.

24. The electrochromic device according to claim 1, wherein the electrolyte is comprised of a solid polymeric material.

25. The electrochromic device according to claim 1, wherein the electrolyte is comprised of at least one monomer which is polymerizable to a solid after exposure to heat or radiation.

* * * * *

UNITED STATES PATENT AND TRADEMARK OFFICE
CERTIFICATE OF CORRECTION

PATENT NO. : 5,780,160

DATED : July 14, 1998

INVENTOR(S) : PIERRE-MARC ALLEMAND ET AL.              Page 1 of 3

It is certified that error appears in the above-identified patent and that said Letters Patent is hereby corrected as shown below:

COLUMN 3

Line 6, "possess" should read --possesses--;
    Line 52, "device" should read --the device--;

COLUMN 4

Line 2, "an" should read --a--;
    Line 4, "invention," should read --invention--;
    Line 23, "self reduces" should read --self-reduces--;

COLUMN 5

Line 13, "feature" should read --features--;

COLUMN 8

Line 54, "polyvinylmetalocenes," should read --polyvinylmetallocenes,--;
    Line 55, "(fullerness)" should read --(fullerenes)--;

UNITED STATES PATENT AND TRADEMARK OFFICE
CERTIFICATE OF CORRECTION

PATENT NO. : 5,780,160

DATED : July 14, 1998

INVENTOR(S) : PIERRE-MARC ALLEMAND ET AL.

It is certified that error appears in the above-identified patent and that said Letters Patent is hereby corrected as shown below:

COLUMN 9

Line 27, "3-hydroxyproprionitrile," should read
   --3-hydroxypropionitrile,--;
   Line 32, "3,3'-oxydiproprionitrile," should read
   --3,3'-oxydipropionitrile--;

COLUMN 10

Line 31, "affect" should read --effect--;

COLUMN 11

Line 14, "preferred," should read --preferred--;

COLUMN 13

Line 57, "a" should read --an--;

COLUMN 15

Line 48, "1 hours" should read --1 hour--;

COLUMN 17

Line 14, "back filled" should read --backfilled--;

UNITED STATES PATENT AND TRADEMARK OFFICE
CERTIFICATE OF CORRECTION

PATENT NO. : 5,780,160

DATED : July 14, 1998

INVENTOR(S): PIERRE-MARC ALLEMAND ET AL.

It is certified that error appears in the above-identified patent and that said Letters Patent is hereby corrected as shown below:

COLUMN 18

Line 1, "beam" should read --bead--;
　　Line 12, "4%." should read --4%--;
　　Line 47, "Pani" should read --PANI--;
　　Line 48, "Pani" should read --PANI--;

COLUMN 19

Line 1, "as" should read --was--.

Signed and Sealed this

Thirteenth Day of July, 1999

Attest:

Attesting Officer

Q. TODD DICKINSON

Acting Commissioner of Patents and Trademarks